United States Patent
Ip et al.

(10) Patent No.: US 11,344,813 B2
(45) Date of Patent: May 31, 2022

(54) SYSTEM AND METHOD FOR DEVELOPING, HOSTING, AND OPERATING A GAME

(71) Applicant: United Intellectuals International Limited, Wanchai (HK)

(72) Inventors: Hong Ip, Taipa (MO); Chilam Iao, Taipa (MO); Chi-man Lei, Taipa (MO); Cheokman Wu, Taipa (MO)

(73) Assignee: United Intellectuals International Limited, Wanchai (HK)

( * ) Notice: Subject to any disclaimer, the term of this patent is extended or adjusted under 35 U.S.C. 154(b) by 28 days.

(21) Appl. No.: 16/753,030

(22) PCT Filed: Jun. 21, 2018

(86) PCT No.: PCT/CN2018/092204
§ 371 (c)(1),
(2) Date: Apr. 2, 2020

(87) PCT Pub. No.: WO2019/071979
PCT Pub. Date: Apr. 18, 2019

(65) Prior Publication Data
US 2020/0316479 A1    Oct. 8, 2020

(30) Foreign Application Priority Data

Oct. 13, 2017   (HK) .................................. 17110331.8

(51) Int. Cl.
*A63F 13/795*   (2014.01)
*A63F 13/35*    (2014.01)

(52) U.S. Cl.
CPC ............ *A63F 13/795* (2014.09); *A63F 13/35* (2014.09)

(58) Field of Classification Search
CPC ........ A63F 13/795; A63F 13/35; A63F 13/77; A63F 13/335; A63F 13/60; A63F 13/79; G06F 8/41
USPC .......................................................... 463/42
See application file for complete search history.

(56) References Cited

U.S. PATENT DOCUMENTS

| | | | | |
|---|---|---|---|---|
| 9,120,007 | B2* | 9/2015 | Costello | G07F 17/3223 |
| 2011/0159966 | A1* | 6/2011 | Gura | G07F 17/3223 |
| | | | | 463/42 |
| 2012/0317034 | A1* | 12/2012 | Guha | G07F 17/3251 |
| | | | | 705/65 |

(Continued)

FOREIGN PATENT DOCUMENTS

| | | |
|---|---|---|
| CN | 101094227 | 9/2010 |
| CN | 101335916 | 6/2012 |

(Continued)

OTHER PUBLICATIONS

Hong Kong Search Report.

*Primary Examiner* — Xuan M Thai
*Assistant Examiner* — Michael A Cuff
(74) *Attorney, Agent, or Firm* — Renner Kenner Greive Bobak Taylor & Weber (57) ABSTRACT

A computer-implemented gaming platform for hosting and operating a game of chance. The gaming platform includes a game builder arranged to build a game of chance using data representing a game of chance, the data including game math, game client, and game backend; a game storage arranged to store the built game; and a game administration and operation engine operably connected with the game storage for operating the game of chance.

27 Claims, 7 Drawing Sheets

(56) References Cited

U.S. PATENT DOCUMENTS

| | | | | |
|---|---|---|---|---|
| 2013/0296047 | A1* | 11/2013 | Borissov | G07F 17/32 |
| | | | | 463/31 |
| 2014/0024464 | A1 | 1/2014 | Belakovsky | |
| 2014/0087355 | A1* | 3/2014 | Henry | G09B 7/00 |
| | | | | 434/362 |
| 2014/0141861 | A1* | 5/2014 | Szendel | A63F 13/30 |
| | | | | 463/22 |
| 2014/0194209 | A1* | 7/2014 | Ziouvelou | G06Q 30/0279 |
| | | | | 463/42 |
| 2014/0372998 | A1* | 12/2014 | Salameh | G06F 8/65 |
| | | | | 717/169 |
| 2015/0105153 | A1* | 4/2015 | Xu | A63F 13/798 |
| | | | | 463/31 |
| 2015/0199868 | A1* | 7/2015 | Kelly | G07F 17/3223 |
| | | | | 463/25 |
| 2015/0217191 | A1 | 8/2015 | Yan | |
| 2016/0110943 | A1* | 4/2016 | Nicely | G07F 17/3267 |
| | | | | 463/20 |
| 2016/0162275 | A1* | 6/2016 | Morley | H04L 67/02 |
| | | | | 717/170 |
| 2016/0180647 | A1* | 6/2016 | Webb | G07F 17/3258 |
| | | | | 463/27 |
| 2017/0186272 | A1* | 6/2017 | Schwartz | G07F 17/3227 |
| 2017/0316652 | A1* | 11/2017 | Siebert | A63F 13/795 |
| 2018/0077081 | A1* | 3/2018 | Lauer | H04L 47/50 |
| 2018/0084073 | A1* | 3/2018 | Walsh | H04L 67/2819 |
| 2019/0158484 | A1* | 5/2019 | Grunewald | A63F 13/73 |

FOREIGN PATENT DOCUMENTS

| | | |
|---|---|---|
| CN | 104245065 | 12/2014 |
| CN | 104267963 | 1/2015 |
| CN | 104994101 | 10/2015 |
| CN | 105554096 | 5/2016 |

* cited by examiner

SYSTEM AND METHOD FOR DEVELOPING, HOSTING, AND OPERATING A GAME

TECHNICAL FIELD

The invention relates to the gaming industry. More specifically, although not exclusively, the invention relates to a system and method for developing, hosting, and operating a game, in particular a game of chance.

BACKGROUND

Driven by the demand from the gaming public, there is a need in the gaming field for development of new games of chance. Typically, to create a new game of chance, the game developer needs to design the game logic, set goals and rules, design game graphics and audio, etc. This process usually requires a large amount of effort and time. In case where the game is a wagering game, the game developer also needs to obtain regulatory approval for the game. Problematically, regulatory schemes in the gaming industry are diverse, complex, and sometimes jurisdictional. Because of these complexities, the development of new games of chance has been served only by a limited number of companies and game developers who have sufficient time and human resources to do so.

To keep up with the demand of development of new games, there is a need to provide a method and system that facilitate game development in an efficient manner and with a lower barrier of entry for individual game developers with relatively limited resources.

SUMMARY OF THE INVENTION

In accordance with a first aspect of the invention, there is provided a computer-implemented gaming platform for developing, hosting, and operating a game of chance, comprising: a game builder arranged to build a game of chance using data representing a game of chance, the data including game math, game client, and game backend; a game storage arranged to store the built game; and a game administration and operation engine operably connected with the game storage for operating the built game.

In one embodiment of the first aspect, the gaming platform is distributed on a cloud computing arrangement. The cloud computing arrangement may be stand-alone or distributed on individual software, hardware or a combination of software and hardware components on one or more computer networks.

In one embodiment of the first aspect, the game administration and operation engine comprises: input interfaces arranged to receive player input for playing the game; a random result generator arranged to regulated by at least one gaming regulatory agency, the random result generator is arranged to generate a random game result or a pseudorandom game result as a game play result based on the received player input; and an output interface for outputting the generated game result.

In one embodiment of the first aspect, the game of chance is a wagering game. Alternatively, the game of chance is a non-wagering game.

In one embodiment of the first aspect, the computer-implemented gaming platform further comprises a regulatory handling module arranged to handle the regulatory data associated with the game of chance.

In one embodiment of the first aspect, the game administration and operation engine further comprises: an accounts management module arranged to manage accounts and funds data associated with the game or with the player.

In accordance with a second aspect of the invention, there is provided a method for developing and deploying a game of chance, comprising the steps of: receiving, at a game registry of a computer-implemented game development platform, data representing a game of chance, the data including game math, game client, and game backend; compiling, at a compilation module of the computer-implemented game development platform, the data representing the game of chance so as to create a game of chance to be run on a gaming system with one or more game control modules regulated by one or more gaming regulatory agencies; and validating, at a validation module of the computer-implemented game development platform, a compatibility of the compiled game of chance with the computer-implemented game development platform and the game math of the compiled game of chance.

In one embodiment of the second aspect, the method further comprises the step of: developing, at a game development module of the computer-implemented game development platform, the data representing the game of chance.

In one embodiment of the second aspect, the game development module comprises one or more of: software development kit, simulator, and game development guide, for facilitating development of the data representing the game.

In one embodiment of the second aspect, the method further comprises the step of: publishing the validated game on a game store of the computer-implemented game development platform.

In one embodiment of the second aspect, the computer-implemented game development platform is arranged to host the validated game.

In one embodiment of the second aspect, the computer-implemented game development platform is distributed on a cloud computing arrangement. The cloud computing arrangement may be stand-alone or distributed on individual software, hardware or a combination of software and hardware components on one or more computer networks.

In one embodiment of the second aspect, the gaming system is part of the computer-implemented game development platform.

In one embodiment of the second aspect, the game of chance is a wagering game. Alternatively, the game of chance is a non-wagering game.

In one embodiment of the second aspect, the game math comprises a pay table.

In one embodiment of the second aspect, the game math comprises RTP of the game.

In one embodiment of the second aspect, the one or more game control modules comprise one or more of game metering module and random result generator module. The random result generator module preferably comprises a random number generator.

In accordance with a third aspect of the invention, there is provided a system for developing and deploying a game of chance, comprising a computer-implemented game development platform having: a game registry arranged to receive data representing a game of chance, the data including game math, game client, and game backend; a compilation module arranged to compile the data representing the game of chance so as to create a game of chance to be run on a gaming system with game control modules regulated by one or more gaming regulatory agencies; and a validation module arranged to validate a compatibility of the compiled game of chance with the computer-implemented game development platform and the game math of the compiled game of chance.

In one embodiment of the third aspect, the computer-implemented game development platform further comprises a game development module for developing the data representing the game of chance.

In one embodiment of the third aspect, the game development module comprises one or more of: software development kit, simulator, and game development guide, for facilitating development of the data representing the game.

In one embodiment of the third aspect, the computer-implemented game development platform further comprises a game store for publishing the validated game.

In one embodiment of the third aspect, the computer-implemented game development platform is arranged to host the validated game.

In one embodiment of the third aspect, the computer-implemented game development platform is distributed on a cloud computing arrangement. The cloud computing arrangement may be stand-alone or distributed on individual software, hardware or a combination of software and hardware components on one or more computer networks.

In one embodiment of the third aspect, the gaming system is part of the computer-implemented game development platform.

In one embodiment of the third aspect, the game of chance is a wagering game. Alternatively, the game of chance is a non-wagering game.

In one embodiment of the third aspect, the game math comprises a pay table.

In one embodiment of the third aspect, the game math comprises RTP of the game.

In one embodiment of the third aspect, the one or more game control modules comprise one or more of game metering module and random result generator module. The random result generator module preferably comprises a random number generator.

In accordance with a fourth aspect of the invention, there is provided a computer-implemented gaming platform for hosting and operating a game of chance, comprising: a game storage arranged to store data representing a game of chance, the data including game math, game client, and game backend; a game engine operably connected with the game storage for operating the game of chance, the game engine providing an interface for receiving game play instructions from a player for playing the game of chance, processing the game play instructions to provide a game play result; a random result generator, in connection with the game engine, for generating a random game result or a pseudo-random game result as a game play result, the random result generator being regulated by at least one gaming regulatory agency.

In one embodiment of the fourth aspect, the game storage is further arranged for storing game play result.

In one embodiment of the fourth aspect, the computer-implemented gaming platform is distributed on a cloud computing arrangement. The cloud computing arrangement may be stand-alone or distributed on individual software, hardware or a combination of software and hardware components on one or more computer networks.

In one embodiment of the fourth aspect, the data representing the game of chance has been compiled and certified prior to storage on the game storage.

In one embodiment of the fourth aspect, the computer-implemented gaming platform further comprises a bonus or jackpot module operably connected with the game engine to provide a bonus game or jackpot prize. The jackpot prize may be scores or other bonuses for non-wagering game, and may be money for wagering game.

In one embodiment of the fourth aspect, the game of chance is a wagering game.

In one embodiment of the fourth aspect, the computer-implemented gaming platform further comprises a credit handling module for handling wagering information associated with the game of chance.

In one embodiment of the fourth aspect, the computer-implemented gaming platform further comprises a game operation configuration module arranged to provide configuration information including regulatory information to the game engine for controlling operation of the game of chance.

BRIEF DESCRIPTION OF THE DRAWINGS

Embodiments of the invention will now be described, by way of example, with reference to the accompanying drawings in which.

DETAILED DESCRIPTION OF THE PREFERRED EMBODIMENT

Figure 1:
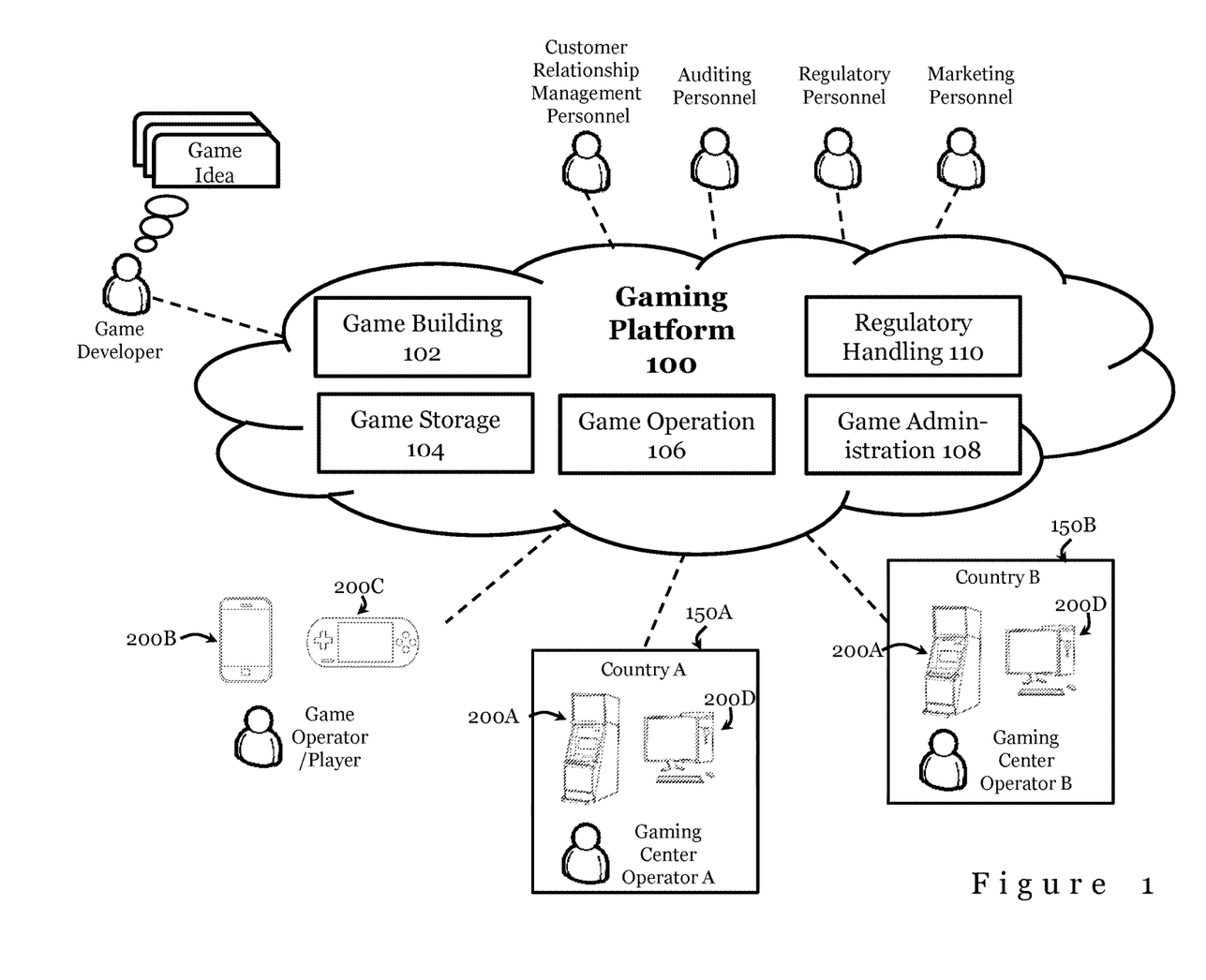
FIG. 1 is a schematic diagram of a gaming platform in accordance with one embodiment of the invention.

Referring to FIG. 1, there is shown a schematic diagram of a gaming platform 100 arranged for developing, hosting, and operating games in accordance with one embodiment of the invention. Preferably, the gaming platform 100 is distributed on a cloud computing arrangement that may be stand-alone or distributed on individual software, hardware, or a combination of software and hardware components on one or more computer networks. The gaming platform 100 includes a game building module 102 arranged to facilitate building of a game by a game developer. The game is preferably a game of chance, in particular a wagering game, although non-wagering game is also applicable. In one example, the game building module 102 preferably provides one or more software tools, kits, simulator, and game development guide and documents, etc., to assist game developers in building and creating a game. The game building module 102 may include software tools that facilitate game developers to develop a game of chance that complies with various regulatory requirements. The game building module 102 may also include simulators arranged to allow the game developer to test whether the game-in-development or the built game is in compliance with the system setting and/or regulatory requirement. The built game can be stored in a game storage 104. In one example, the game storage 104 may allow a player to purchase or download the built game.

A game operation engine 106 and a game administration engine 108 are arranged in the platform 100 to enabling the game to be played. The game operation engine 106 and game administration engine 108 includes modules for operating the games in the game storage 104. Preferably, the game operation and administration engine 106, 108 includes a random result generator in the form of a random number generator for generating a random or pseudorandom game result based on player input. The game operation and administration engine 106, 108 may also include one or more gaming meters. The game results can be stored in the platform 100, for example, in the game storage 104 or in a separate storage module. A regulatory handling module 110 is arranged in the platform 100 to manage modules that require regulatory approval (such that the random result generator and various game meters) and manage related data.

Figure 2A:
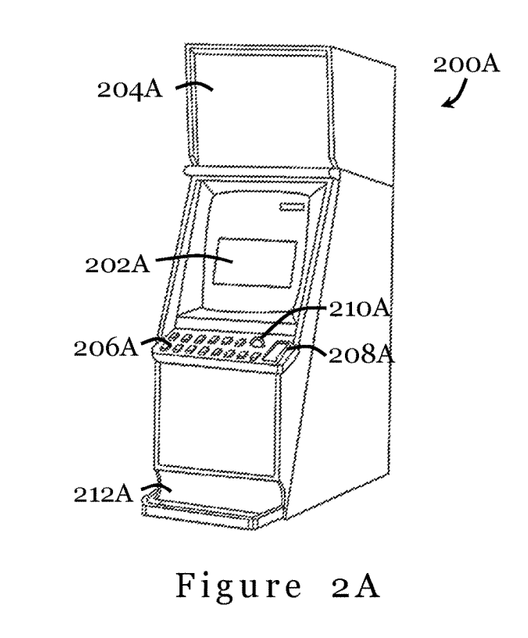
FIG. 2A is a schematic diagram of a gaming machine in the form of a stand-alone machine which functions as a gaming interface of the gaming platform of FIG. 1.
Figure 2B:
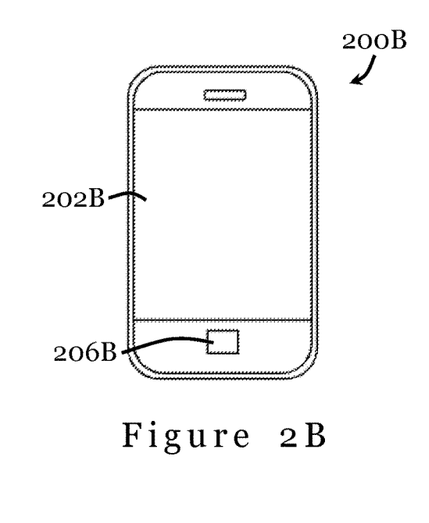
FIG. 2B is a schematic diagram of a gaming machine in the form of a mobile communication device which functions as a gaming interface of the gaming platform of FIG. 1.
Figure 2C:
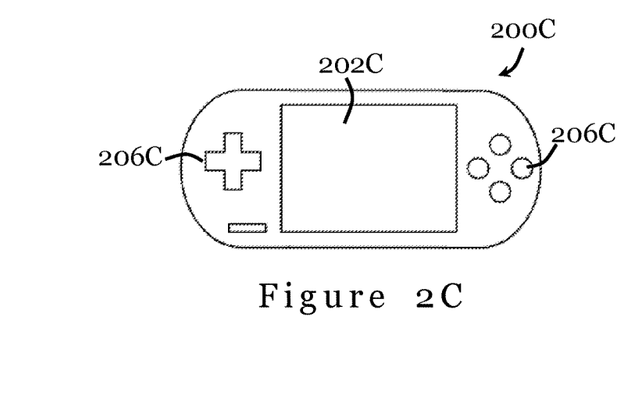
FIG. 2C is a schematic diagram of a gaming machine in the form of a portable game playing device which functions as a gaming interface of the gaming platform of FIG. 1.
Figure 2D:
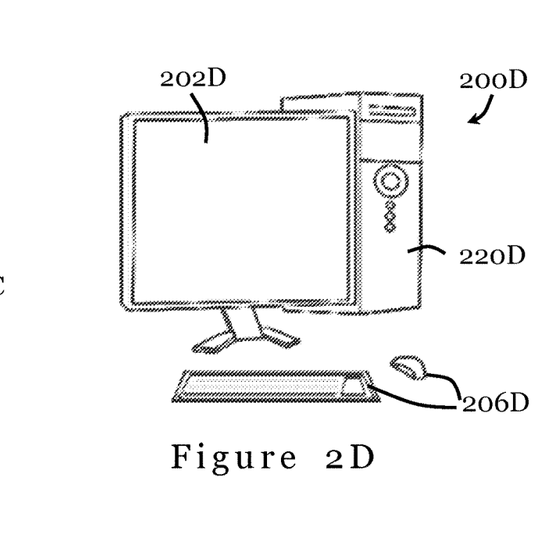
FIG. 2D is a schematic diagram of a gaming machine in the form of a computer system which functions as a gaming interface of the gaming platform of FIG. 1.

The gaming platform 100 may be utilized by a land-based gaming centers 150A, 150B in different countries (Countries A and B) for operating their respective gaming machines 200A, 200D. The gaming machines 200A, 200D may be in the form of a slot machine 200A or a computer 200D. Preferably, the games in the gaming platform 100 may be accessed by the gaming machines 200A, 200D through wired or wireless communication links. In other words, the gaming machines 200A, 200D in the gaming center 150A, 150B need not be pre-installed with a game but instead can load any game available on the game storage 104 on the platform 100. Updates and maintenance of the game can be performed through the platform 100, without the need for the same at the gaming machines 200A, 200D. In one embodiment, the gaming center operator may manage the gaming machines 200A, 200D associated with the gaming center 150A, 150B through the gaming platform 100, which contains a record of the game, the game result, game events, wagering information, player information, account information, etc. Preferably, each gaming center 150A, 150B has an independent gaming platform account, accessible through a content distribution network. Through the respective gaming platform account, the gaming center 150A, 150B can manage information or data related to its own gaming business, and which is not accessible by another gaming center.

Apart from land-based gaming centers 150A, 150B, the gaming platform can also be used by web-based gaming platform or individual gamers using gaming machines 200B, 200C such as a mobile phone 200B, a tablet, a laptop, a handheld game playing device 200C, a computer, etc. The games in the gaming platform 100 may be accessed by the gaming machines 200B, 200C through wired or wireless communication links. A game player can download and run the game that he/she wishes to play, and play it using his/her gaming machine 200B, 200C, anywhere, any time.

In one embodiment, the game operation and administration engine 106, 108 is arranged to separately manage operation of gaming machines 200A, 200D from different gaming centers 150A, 150B. For example, the random result generator may only be shared by gaming machines (not necessarily all) in one gaming center. In another embodiment, the gaming operation and administration engine 106, 108 is arranged to manage operation of gaming machines 200A, 200D from different gaming centers 150A, 150B, in which case the random result generator may be shared by different gaming machines 200A, 200D in different gaming centers 150A, 150B. The game operation and administration engine 106, 108 can separately handle information and data of games played by individual game players through their gaming machines 200A, 200D. In one example, the game operation and administration engine 106, 108 may be arranged to separately handle different types of games, or alternatively, it may handle different types of games at the same time.

The gaming platform 100 can be accessed and managed by various management personnel. For example, the gaming platform 100 allows auditing personnel to perform auditing based on the accounts and financial record in the gaming platform 100. Auditing may be performed separately for different gaming centers 150A, 150B, through their respective auditing account, such that an auditing personnel auditing one gaming center cannot access the accounts and financial information of another gaming center. The gaming platform 100 also allows for regulatory personnel to inspect and audit data related to compliance of regulatory requirement. Compliance may be determined separately for different gaming centers 150A, 150B, or may be determined separately based on jurisdiction. Marketing personnel can access the gaming platform to provide marketing information to the player through the games. Customer relationship management personnel can manage customer relation using data on the platform, such as player play history, player account information, etc. Preferably, each gaming center 150A, 150B is arranged to perform customer relationship management only for its customers. In one example, data on the gaming platform 100 may be obtained and analysed to improve service and hence to improve customer satisfaction.

In one embodiment, the gaming platform 100 may be jurisdictional, that is, it is only responsible for games in one country or area which has specific regulatory requirement. For example, the gaming platforms 100 for different jurisdictions may be held on different cloud computing networks or arrangement, and they preferred are operationally independent of each other.

FIG. 2A shows a gaming machine 200A in the form of a stand-alone machine which functions as a gaming interface of the gaming system in accordance with one embodiment of the present invention. As shown in FIG. 2A, the gaming machine 200A includes a console having a display screen 202A for displaying the game to the player. In addition, the gaming machine 200A may also include a further display 204A for displaying pay tables, bonus awards and other gaming graphics or information. In one embodiment, the display screen 202A may be a touch sensitive screen for allowing the player to interact with the gaming machine 200A. In one example, the display screen 202A and the further display 204A may be any suitable types of video/graphics display unit, such as but not limited to a CRT display, a LCD display or a plasma screen. The gaming machine 200A may also have one or more display screens arranged to display the game to the player. Input buttons 206A, controllers or actuators are preferably provided on the gaming machine 200A so as to allow the player to interact with the gaming machine and hence to play the game. The gaming machine 200A may also include a credit input mechanism, which may be, for example, a bill collector 208A, a coin collector 210A, and a card reader (not shown) for reading an identification card, a credit card or a debit card. Alternatively, virtual currency may also be available through player identification and communication with appropriate clearing houses. In addition, a credit output mechanism is provided in the gaming machine for distributing payouts. The credit output mechanism may include a bill/coin tray 212A for distributing cash payouts from the gaming machine 200A. A marketing module with a reader or detector (not shown) may also be provided for reading a player tracking means in the form of a card, or other portable storage medium readable by the reader or detector so as to obtain/track player information in a loyalty program.

It should be noted that the gaming machine described above is merely exemplary and should not be considered limiting. For example, the gaming machine in some embodiments of the present invention may be arranged to operate, at least partially, as a slot machine, a fruit machine, and a poker machine. Other types of stand-alone gaming machines that do not include all the components as described above or with addition components may also function as a gaming interface in the gaming system of the present invention.

FIG. 2B shows a mobile communication device 200B which functions as a gaming interface of the gaming system in accordance with one embodiment of the present invention. Preferably, the mobile communication device 200B in FIG. 2B comprises one or more buttons 206B and a touch sensitive screen 202B for receiving player input and displaying the game output. The mobile communication device 200B also includes a communication module for communicating data with a game processing network such as a game processing cloud through a communication link so as to enable a game to be played.

FIG. 2C shows a portable game playing device 200C which functions as a gaming interface of the gaming system in accordance with one embodiment of the present invention. In this particular embodiment, the portable game playing device 200C comprises a number of control buttons/switches 206C for receiving player input, and a display screen 202C for displaying the game. Optionally the display screen 202C may also be touch-sensitive for receiving player input. In addition, the game playing device 200C further comprises a communication module for communicating data with a game processing network such as a game processing cloud so as to enable game play.

FIG. 2D shows a computer system 200D which may function as a gaming interface of the gaming system in accordance with one embodiment of the present invention. The exemplary computer system 200D in this embodiment comprises a display screen 202D for displaying the game, a keyboard and mouse 206D for the player to input game play information into the computer system, and a host machine 220D in communication with a computing network, e.g. a game processing cloud computing network, for processing the game. In a preferred embodiment, game processing is solely performed in the game processing cloud, and the computer system 200D is only arranged to be a gaming interface that receives game input from the player and returns game output processed at the game processing cloud to the player. Graphical rendering and audio generation is preferably performed in the computer system 200D by a graphical and audio processor such as a graphics card or a sound card or a sound synthesizer arranged to render a composed image or animation or generate sound based on composed sound data, although the graphical rendering and audio generation may also be performed in the game processing cloud. A skilled person in the art would readily appreciate that any types of computer system that is operable to receive player input, communicate with a cloud computing network, and display game output, may be arranged to operate as a gaming interface in the present invention.

Although not specifically shown in the Figures of 2A-2D, in a preferred embodiment, the gaming interfaces in these Figures may include a computer, a computing device, an electronic processing circuit, or any information handling systems. The computing device/information handling system may comprise any suitable components necessary to receive, store and execute appropriate computer instructions. These components may include a processing unit, a read-only memory (ROM), a random access memory (RAM), and input/output devices such as graphics or audio processors (e.g. graphics rendering card or sound synthesizer card), disk drives, input devices such as an Ethernet port, a USB port, etc.; a display such as a liquid crystal display, a light emitting display or any other suitable display; and communications links. The computing device/information handling system includes instructions that may be included in ROM, RAM or disk drives and may be executed by the processing unit. There may be provided a plurality of communication links which may variously connect to one or more other computing devices/information handling devices such as a server, personal computers, terminals, wireless or handheld computing devices. At least one of a plurality of communications link may be connected to an external computing network through a wired or wireless communications link. The computing device/information handling system may include storage devices such as a disk drive which may encompass solid state drives, hard disk drives, optical drives or magnetic tape drives. Also, the computing device/information handling system may use a single disk drive or multiple disk drives. Furthermore, the computing device/information handling system may also have a suitable operating system which resides, for example, on the disk drive or in the ROM of the computing device/information handling system.

Figure 3:
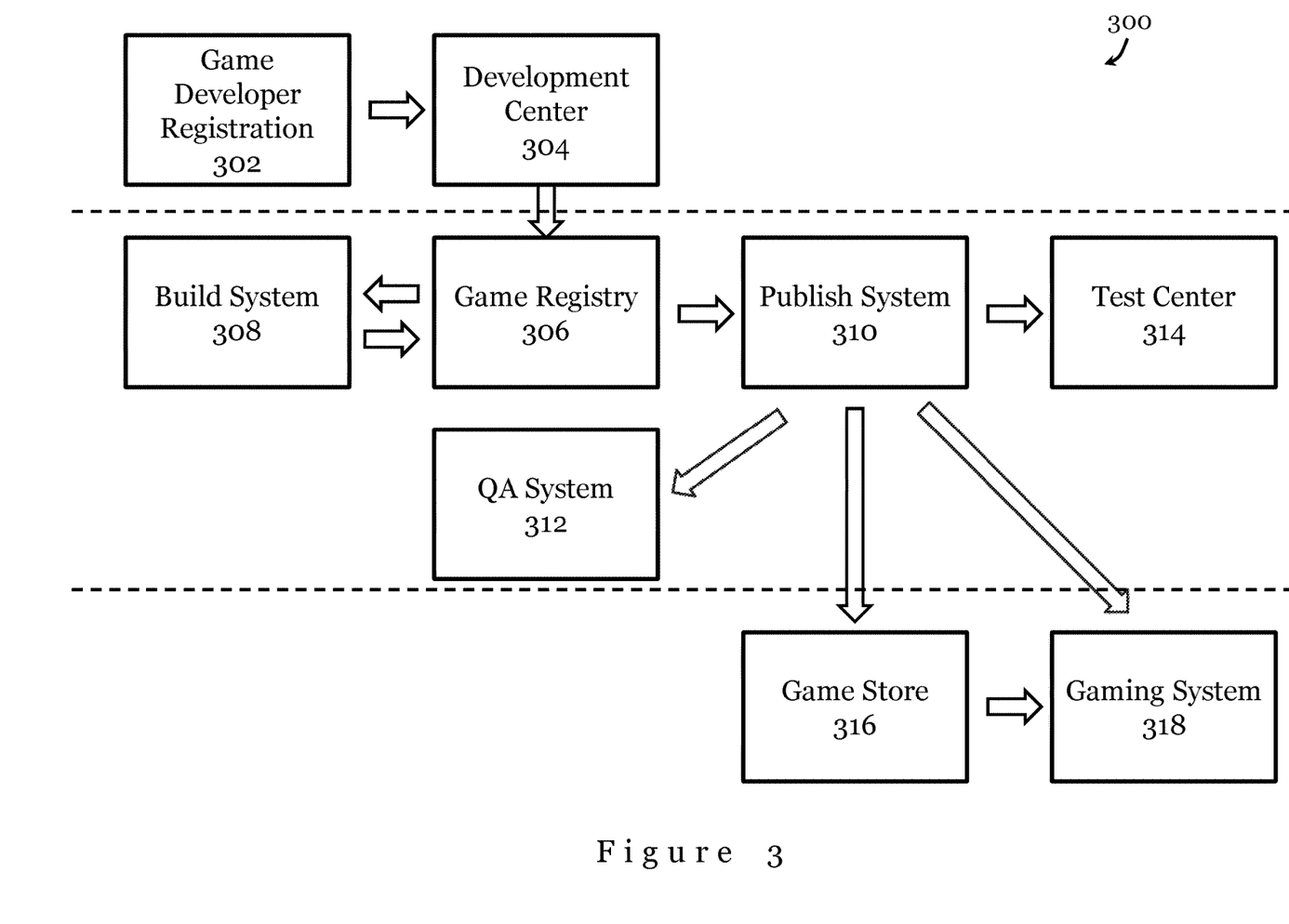
FIG. 3 is a schematic flow diagram of a system for developing and deploying a game of chance and it associated operation in accordance with one embodiment of the invention.

FIG. 3 shows a system 300 for developing and deploying a game of chance and it associated operation. In the present embodiment, the system 300 is distributed on a cloud computing arrangement that may be stand-alone or distributed on individual software, hardware, or a combination of software and hardware components on one or more computer networks. The system 300 includes a game developer registration module 302. Game developers who wish to the system 300 must register through the module 302 in order to use the system 300. The game developer registration module 302 may allow individual game developers to register to the system 300, or it may allow multiple game developers working on the same project or game to be registered as a team. For game developers registered as a team, one of them may be assigned the role of an administrator, which has the authority to add additional developers to the team or may remove existing developers from the team. Optionally, the game developer registration module 302 may require payment of a fee such as subscription fee to register.

The system 300 also includes a game development center 304. The game development center 304 may be implanted as a land-based facility, a web-based facility that a player can access remotely using a computing device, or a combination of both. The game development center 304 contains software tools, kits, simulator, and game development guide and documents, newsletter, etc., which facilitate building or creation of a game of chance. Preferably, these tools, kits, and documents are regularly updated to improve the game development experience. By using these facilities provided in the game development center 304, game developers can create data associated with generation of a game of chance. The data may include game math, game client, and game backend. In the embodiment of a wagering game, the game math may comprise pay tables, RTP, etc. In another embodiment of a non-wagering game, the game math may be scoring schemes, etc. The game backend may include game instructions, game logic, as well as game graphics, animation, audio, etc. The game client may include a network client for connection to a server, such as that in a cloud computing arrangement, to communicate game state, game data, and game information to the server. The network client may be used to process data and instructions for performing game play management and accounting function, and/or to provide input/output function of the game (receive players input, analyse data, provide feedback, etc.).

As shown in FIG. 3, a game registry 306 in the form of a game repository is arranged in the system 300. The game registry 306 is arranged to receive, and optionally store the data associated with the game of chance, including the game math, game client, and game backend. The game registry 306 is arranged to transmit the data to a build system 308 for the raw data to be processed and built into a format suitable for operation on the system 300. The build system 308 is arranged to combine and bundle the game math, game client, and game backend into a game file. The game file so created contains game assets with game container and game client in appropriate format. The build system 308 is arranged to transmit the built game file to the game registry 306.

Preferably, the build system 308 also performs basic quality assessment function by checking initial compatibility of the raw data with the system 300. If the build system 308 cannot successfully compile the game, a notification may be sent to the game developer (optionally through the game registry 306), so that the game developer can debug the game data. Alternatively, if the build system 308 successfully compiles the game, a notification may be sent to the game developer (optionally through the game registry 306) so that the game developer knows that the game has been successfully compiled without error.

Once the built game is returned to the game registry 306, the game registry 306 may register the built game. In one example, the game registry 306 may also store the built game. In the present embodiment, the game registry 306 also allows game developers or managers of the system 300 to publish or suspend the game. The game registry 306 may also provide a game status viewing function to provide game developers with the information related to the status of the game (for example, at which stage of development or at which module the game is in).

The successfully built game is then sent to a publish system 310 arranged to manage testing, deployment, and publishing of the game. The publish system 310 may be arranged to deploy the game container and the game metadata. More particularly, the publish system 310 may transmit the game to a quality assessment system 312 for quality assessment. The publish system 310 also sends the game metadata such as the default denomination set, pay table, the game ID, and the RTPs, to a test center 314 in the system 300 for testing and certification. If the game has passed the testes in the test center 314, the publish system 310 may notify the game store 316 and preferably also facilitate content distribution network integration of the game.

In the present embodiment, the test center 314 is arranged to perform math validation on the built game operated with the gaming system 318 and to perform quality assessment on the application programming interface associated with the game. Only games that have been properly tested and successfully validated can be published to the game store 316. In one example, if the built game fails to pass a test in the test center 314, a notification is sent to the game developer so that the game developer can change the design of the game. If the built game successfully passes the tests in the test center 314, a notification can be sent to the game developer to notify him/her that the built game has been successfully validated.

The system 300 also includes a gaming system 318 arranged to operate the game. The gaming system 318 has two main roles, one to assist the test and validation process, another to operate the game.

In the first role, the built game under test is run on the gaming system 318 to generate game results which are tested or checked. In this role the gaming system 318 is arranged to perform various game play functions, such as changing the RTP setting, generating a random result such as a random number to facilitate game play, providing a spin and its result (e.g., for a slot game), etc. The gaming system 318 may also allow the testing or certification personnel, the manager of the system, or the game developer(s) to exit the game (i.e., the test).

In the second role, the gaming system 318 is arranged to perform various game play functions, such as changing the denomination setting, changing the RTP setting, generating a random result such as a random number to facilitate game play, providing a spin and its result (e.g., for a slot game), etc. The gaming system 318 may also allow the testing or certification personnel, the manager of the system, or the game developer(s) to exit the game. In this role, the gaming system 318 may also update the game metadata, update the game for the land-based or web-based gaming center, or update the profile of the land-based or web-based gaming center.

In one embodiment, when a game that has successfully passed the tests and validation in the test center 314, the publish system 310 may notify the game store 316 that the game has passed the tests and is ready for hosting and operation. The game may be stored in the game store 316, and retrieved as needed by the gaming system 318. In one example, the game store 316 may allow gamers to access or download the game, in some cases through a purchase. The game store 316 may provide marketing information to gamers. It may also provide game trial function which allows the gamers to trial play a game. The game store 316 optionally provides game selection function and game configuration function for gamers and/or game developers.

Although not specifically described in detail, the gaming system 318 may also perform other functions such as financial management (wager information, result), game state (save/retrieve a game), plater service management (lock/unlock players, authentication), jackpot or bonus handling (e.g., wager prize, bonus game), game recall, etc.

It should be appreciated that the system 300 of FIG. 3 is merely exemplary and various modifications can be made to the system. For example, the modules in the system 300 may be implemented together or further separated into different modules. Also, not all modules are essential in some applications. For example, the system 300 can be without the game developer registration module 302, the QA system 312, etc. Additional modules may be present in the system 300 for extending the functions of the system 300. By using a system like that of the embodiment of FIG. 3, game developers can make use of certified functional modules in the gaming system 318 for operating the game; there is no need for the developers themselves to seek regulatory approval for the gaming system 318. The resulting effect is that significant amount of time and effort can be reduced in building and deploying a game. As a result, the game developers may focus more on perfecting the game logic, math, and client design to create more interesting or challenging games, or games with better graphics and animations. As a result of the above, the entry barrier for game developers is also lowered. The system is also advantageous in that the game can be hosted right after it passes the test, and so again the burden on the game developers is substantially reduced.

Figure 4:
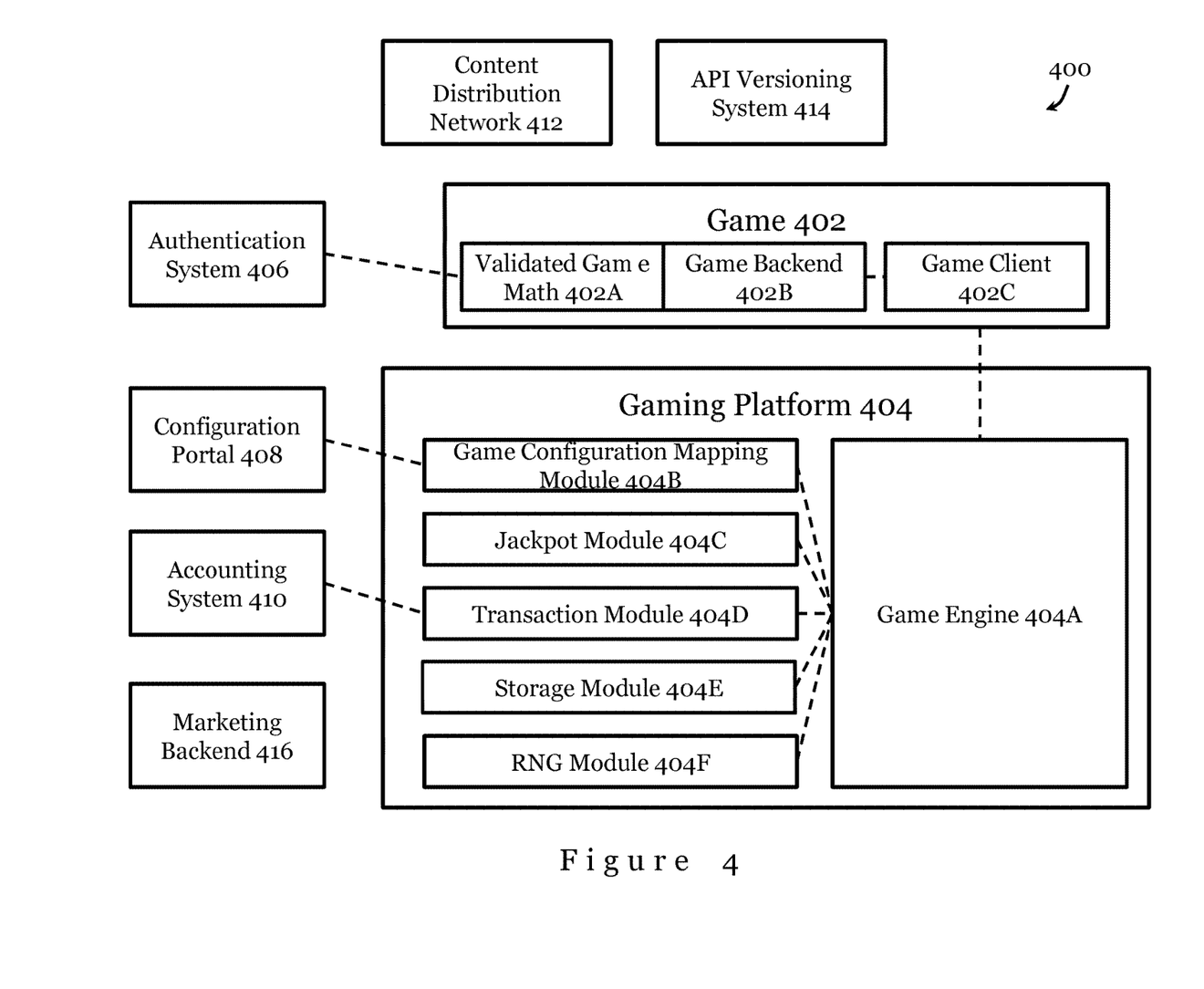
FIG. 4 is a schematic diagram showing architecture of a system for operating a game of chance in accordance with one embodiment of the invention.

FIG. 4 shows architecture of a system 400 for operating a game of chance in accordance with one embodiment of the invention. The system 400 generally includes a game file 402 that has been properly built, a gaming platform 404 for operating the game file 402, and other modules supporting operation of the platform 404. The game 402 comprises game backend, game client, and game math validated by an authentication system such as that in FIG. 3. Preferably, the game 402 is stored in a game storage in a cloud computing arrangement and distributed to the gaming platform 404 through a content distribution network 412. In one embodiment in which the game 402 is a wagering game of chance, the game math 402A may comprise pay tables, RTP, prize distribution scheme, etc. In another embodiment of a non-wagering game, the game math 402A may be scoring schemes, prize distribution scheme, etc. The game backend 402B may include game instructions, game logic, as well as game graphics, animation, audio, etc. The game client 402C may include a network client for connection to a server, such as that in a cloud computing arrangement, to communicate game state, game data, and game information to the server. The game client 402C may be used to process data and instructions for performing game play management and accounting function, and/or to provide input/output function of the game 402 (receive players input, analyze data, provide feedback, etc.).

The gaming platform 404 arranged to operate the game 402 includes a game engine 404A operably connected with a game configuration mapping module 404B, a jackpot module 404C, a transaction module 404D, a storage module 404E, and a random number generator module 404F. Preferably, the gaming platform 404 is hosted on a cloud computing arrangement, which can be separate from or the same as the cloud computing arrangement for storing the game 402. The game engine 404A may operate the game 402 to allow it to be played. The game engine 404A may perform one or more functions of: receive player game play input, query game, manage game session, game disconnection handling, game round management, process attendant pay, process wagering information and data (including RTP, pay tables, denom), manage single-game-multi-instance operation, and regulate free game (such as a free spin for a slot game).

The game configuration mapping module 404B is arranged to map data to provide to the game engine configuration of the game for game or regulatory requirements of different jurisdictions. Preferably, the game configuration mapping module 404B is connected with a configuration portal 408 which allows an operation personnel to chance the configuration setting in the module 404B. The configuration setting may include game client configuration and configuration of RTP.

The jackpot module 404C is arranged to manage jackpot prize of the game 402. Preferably, the jackpot module 404C is networked. The module 404C may be tied to a specific land-based and/or web-based gaming center or may be shared by the same game operating or played in different land-based and/or web-based gaming centers.

The transaction module 404D is arranged to manage financial transaction associated with the game 402 (for wagering game) or to manage score transaction associated with the game 402 (for non-wagering game). The transaction module 404D is operably connected with an accounting system 410, in which financial information or score information associated with the player accounts is stored and processed. In one example, when the player has won a game, he may be given a financial prize or a score. This financial prize or score is transmitted to the accounting system 410 to update the record in the account associated with that player.

The storage module 404E is for general data storage of the game, and it may store game history, transaction history, etc. Data stored in the storage module 404E may be retrieved by the game engine 404A as necessary.

The random number generator module 404F is preferably a certified module that generates random number or random game result for the game to be played.

Other modules supporting operation of the platform 404 includes a content distribution network 412, an API versioning system 414, and marketing backend 416. The content distribution network 412 is arranged to distribute the game from a game storage to the gaming platform. The API versioning module 414 is arranged to ensure backward compatibility of the updates or upgrades to the gaming platform. The marketing backend 416 is arranged for marketing business control and hosting. In one example, the marketing backend 416 is arranged to distribute marketing information to the gamers playing the game.

It should be appreciated that the system 400 of FIG. 4 is merely exemplary and various modifications can be made to the system. For example, the modules in the system 400 may be implemented together or further separated into different modules. Also, not all modules are essential in some applications. The system 400 can be modified to remove one or more of the modules; additional modules may be present in the system 400 for extending the function of the system 400. By using the system 400, in particular the gaming platform 402, the entire game development and game play process can be streamlined.

Figure 5:
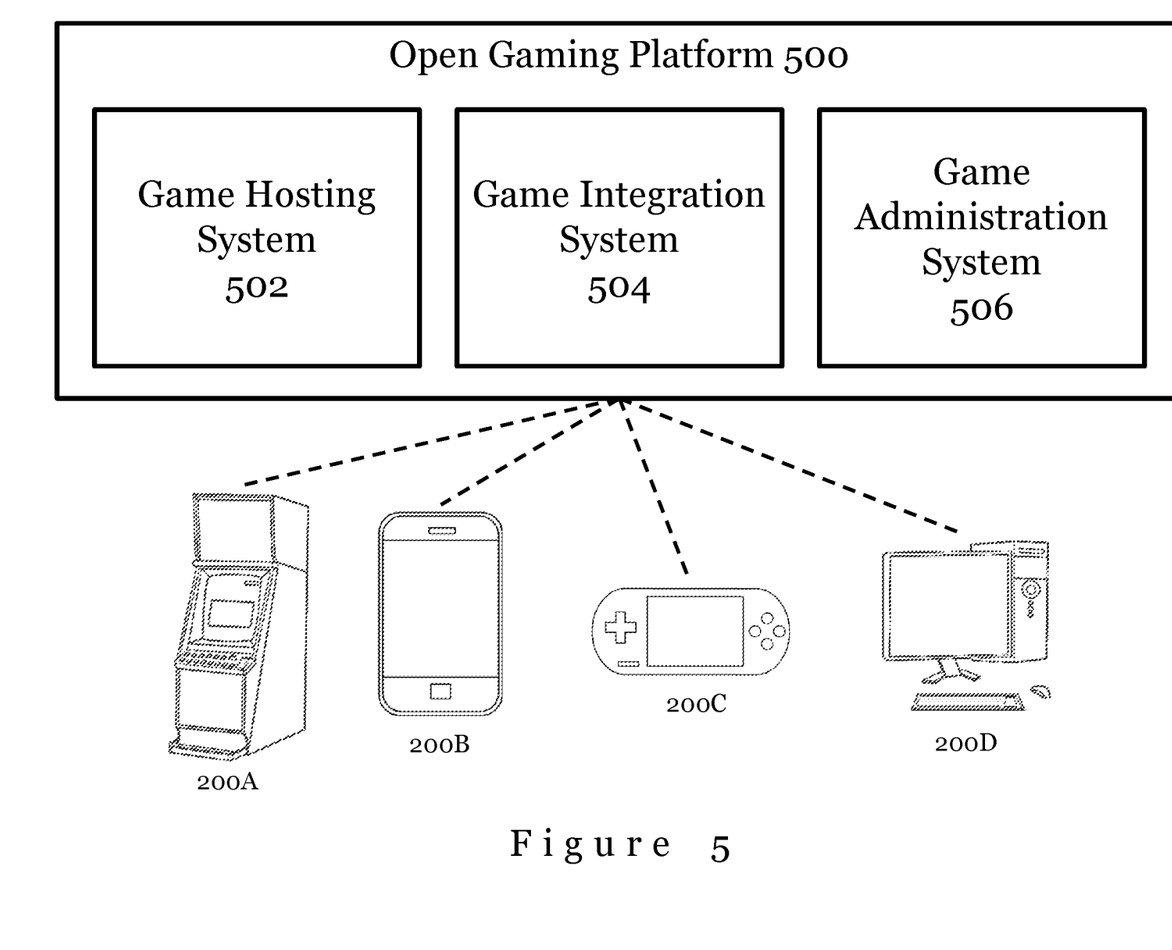
FIG. 5 is a schematic diagram of a gaming platform for hosting and operating a game of chance in accordance with one embodiment of the invention.

FIG. 5 shows a gaming platform 500 for hosting and operating a game of chance in accordance with one embodiment of the invention. The gaming platform 500 includes a game hosting system 502, a game integration system 504, and a game administration system 506, the details of which will be further explained below. The gaming platform 500 can be connected by gamers, gaming center operators or the like using various gaming machines, such that the gaming machines 200A-200D shown in FIGS. 2A-2D.

Figure 6A:
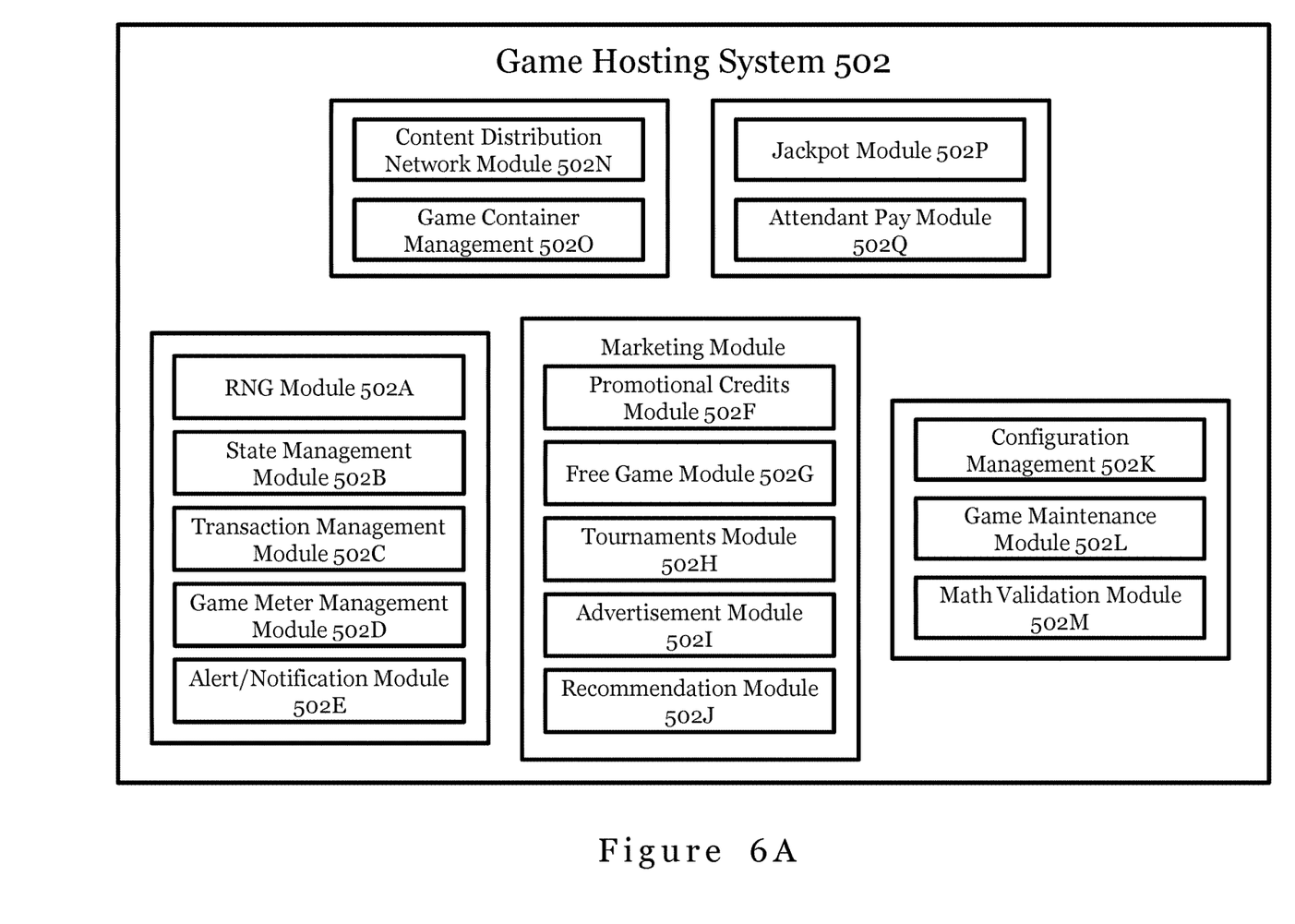
FIG. 6A is a functional block diagram of the game hosting system in the gaming platform of FIG. 5.

Referring to FIG. 6A, the game hosting system 502 includes a game play management module with a RNG module 502A, a state management module 502B, a transaction management module 502C, a game meter management module 502D, and an alert and notification module 502E. In one embodiment, the RNG module 502A is arranged to generate a random number (and hence a random game result) for the game of chance. The state management module 502B is arranged perform storage management (e.g., game data storage, game storage, etc.) as well as game state management such as management of the game logic. The game transaction management module 502C is used for managing financial information associated with player accounts and/or player accounts information. The game meter management module 502D can be used to manage game meters of the gaming platform, which require regulatory approval for operation. The alert and notification module is arranged to provide an alert or notification to the system 502, to the gaming center operator, and/or to the player when a player wins a jackpot prize. In a wagering game, the jackpot prize is a monetary prize; in a non-wagering game, the jackpot prize may be a non-monetary reward such as unlock of special features.

Preferably, the game hosting system 502 also contains a distribution management module with a content distribution network module 502N and a game container management module 502O. The content distribution network module 502N is arranged to control how the game client is distributed to the gaming centers, gaming machines and/or players. The content distribution network module 502N also controls which game can be provided to the gaming centers, gaming machines and/or players. The game container management module 502O is arranged to manage the game container comprising the game client and game backend. In one embodiment, the game container management module 502O may be used to package and deploy the game to be played.

A bonus management module formed by a jackpot module 502P and an attendant pay module 502Q is also provided in the system 502. The jackpot module 502P is preferably built-in in the gaming platform 500, and it may be used to manage the jackpot prize distribution amount and time. The jackpot module 502P may be shared by gaming machines in different gaming centers, or may be dedicated to specific machines in one gaming center. The attendant pay module 502Q is arranged to control the gamer's pay to the attendant. The attendant is a physical person for a physical gaming center, but may be a virtual party for a virtual gaming center.

Figure 6B:
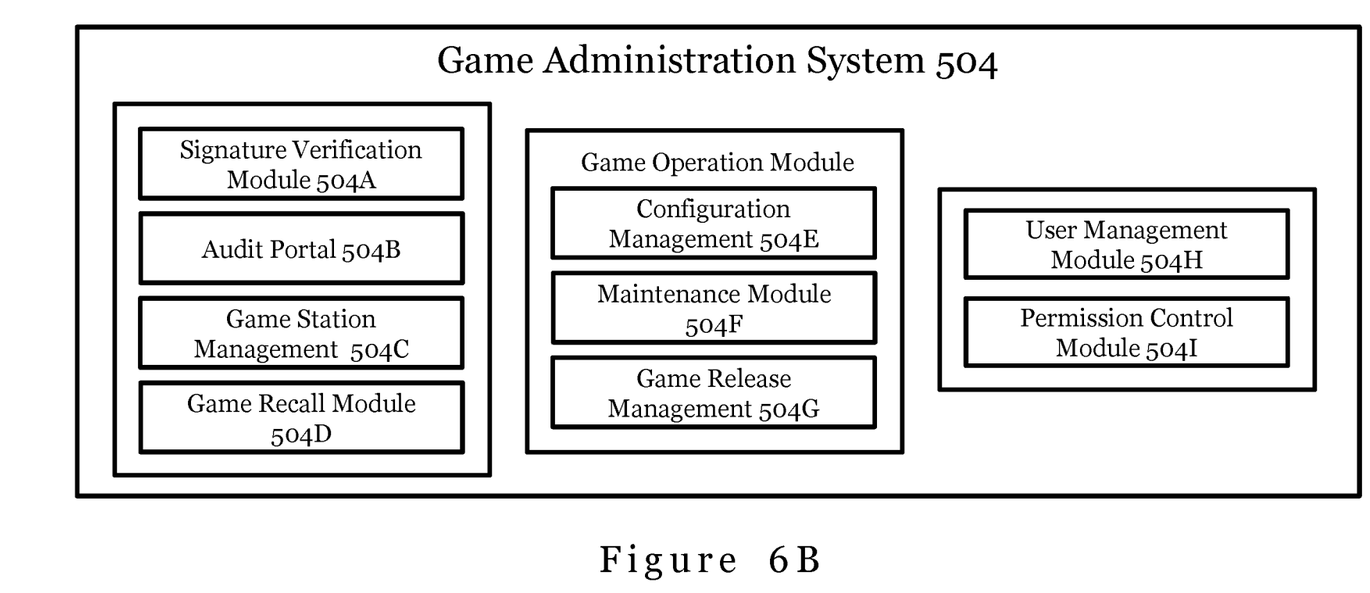
FIG. 6B is a functional block diagram of the game integration system in the gaming platform of FIG. 5.

As shown in FIG. 6B, the system 502 also includes an operation management module having a configuration management module 502K, a game maintenance module 502L, and a game math validation module 502M. The configuration management module 502K may be used for managing the configuration of the system 502, individual games, and/or players, separately or in combination for different physical or virtual gaming centers. The game maintenance module 502L can be used for maintaining a game, for example, updating the game animation, game logic, etc. of the game. In one embodiment, the game maintenance module 502L may be used to remove from the platform games that are not compliant, or to add new games which has been validated by a validation system such as that in FIG. 3. The math validation module is arranged to validate the game math for the specific system 502. The validation may be performed regularly to ensure that the game math of all existing games are compliant with regulatory requirements (may be jurisdictional).

A marketing module may be provided in the system 502 for managing and controlling marketing activities in the system 502. The marketing module can be formed by a promotional credits module 502F, a free game module 502G, a tournaments module 502H, an advertisement module 502I, and a recommendation module 502J. The promotional credits module 502F is arranged to manage distribution of promotional credits, preferably in monetary form. The free game module 502G is arranged to manage the provision of a free game to the player, for example, when a player undertakes certain marketing activities such as viewing an advertisement on the gaming machine. The tournaments module 502H is arranged to manage tournament games across multiple gaming machines, either in the same gaming center or in different gaming centers. The tournaments module 502H may be used to control the rules and prize of individual tournaments, and the participation of gamers in the tournament. The advertisement module 502I is arranged to distribute or provide advertisement information and data to the players through the gaming machine. In one example, the advertisement module 502I is arranged to play an advertisement prior to the player starting the game, after the player completes the game, or in between games. The advertisement module 502I may also provide advertisement data during game play. The recommendation module 502J is arranged to control the provision of game recommendation to the players. For example, the recommendation module 502J may be able to determine the types of games that are played by the same player, and based on the determination, provide similar but new games to the player for him to try, download, or play.

It should be appreciated that FIG. 6A shows only one specific implementation of the game hosting system 502, and that various modules may be renamed, regrouped, added, or removed, to form game hosting system for other embodiments. The game hosting system 502 embodiment is particularly advantageous in that it allows for game logic hosting on pre-built gaming platform, which allows game developers to more readily develop a game that is playable and is in conformity with regulatory requirements. Flexible management of the system at the backend becomes available, and overall operation efficiency of the system can be improved.

FIG. 6B shows the game administration system 504, which preferably operates at the back-of house for individual gaming centers. In this embodiment, the game administration system includes various game control functional modules. The system 504 includes a signature verification module 504A to verify the identity of the auditing personnel, the players, the managers, the operators of the system, etc. An audit portal 504B is arranged to allow the auditing personnel (internal or external) to access data in the system 500 for auditing. The game station management module 504C is arranged to control and management of the gaming machines in the gaming centers. The game recall module is used manage game recall function.

A game operation module with a configuration management module 504E, a maintenance module 504F, and a game release management module 504G is also provided in the system 504. The configuration management module 504E may be used for managing the configuration of the system 504, individual games, and/or players. The game maintenance module 504F can be used for maintaining a game, for example, updating the game animation, game logic, etc. of the game for the gaming center. In one embodiment, the game maintenance module 504F may be used to remove from the platform games that are old and not-popular, or to add new games to the system 504. The game release management manages the various versions and updates of the games, as well as the availability of the games to specific players or during specific time period.

A player management module 504H may be provided to manage player accounts, including opening new accounts, closing existing accounts, updating personal, financial, or other information associated with a specific player account. The permission control module 504I controls player permissions such as whether to allow the player to access specific games or even the gaming platform. Apart from players management, the permission control module 504I may also manage access permission of the auditing personnel, the operator of the system, the marketing personnel, etc.

It should be appreciated that FIG. 6B shows only one specific implementation of the game administration module 504, and that various modules may be renamed, regrouped, added, or removed, to form game hosting system for other embodiments. In one example, the game administration module 504 may be constructed as the system disclosed in U.S. patent application Ser. No. 15/127,621.

Figure 6C:
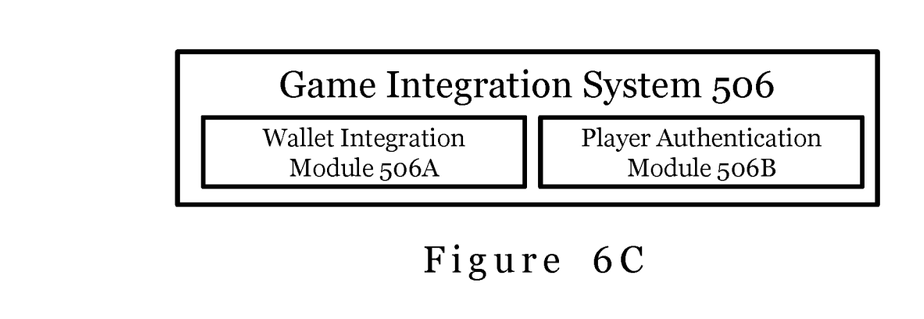
FIG. 6C is a functional block diagram of the game administration system in the gaming platform of FIG. 5.

FIG. 6C shows the game integration system 606 formed by a wallet integration module 506A and a player authentication module 506B. The game integration system 606 is preferably used to bridge the operation of the game administration system 504 (for specific gaming centers) and the operation of the game hosting system 502 (open for all gaming centers). In one embodiment, the wallet integration module 506A may be used for integrate and manage financial information associated with the users of specific gaming centers in the game administration system 504 with a master database in the game hosting system 502. The player authentication module 506B may be used to authenticate player identity, based on a database in the game hosting system 502 and one in the game administration system 504.

It should be appreciated that FIG. 6c shows only one specific implementation of the game integration system 506, and that various modules may be renamed, regrouped, added, or removed, to form game hosting system for other embodiments.

In the present embodiment of FIGS. 5-6C, the game hosting system allows content providers (game developers) to publish contents (game, advertisement, etc.) and content service consumer (e.g., operators, licensees of physical or virtual gaming centers) to utilize the contents; the game integration system allows content providers (game developers) to integrate with content service consumer (operators, licensees of physical or virtual gaming centers); the game administration system allows content service provider (e.g., marketing personnel) to operate the contents in the system, content service consumer to perform internal auditing and inspection, and regulators to perform auditing and inspection.

It should be appreciated that each functional modules described in the above embodiments can be implanted using hardware, software, or both hardware and software, on one or more information handling systems such as computers, servers, etc. Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers, and dedicated hardware devices. Where the terms "computing system" and "computing device" are used, these terms are intended to cover any appropriate arrangement of computer hardware (and software) capable of implementing the function described.

It should be appreciated that numerous variations and/or modifications may be made to the invention as shown in the specific embodiments without departing from the scope of the invention. For example, while the game of the invention is preferably a game of chance, it may also be other games. In the embodiments in which the game is a game of chance, the game may be a wagering game, or alternatively, a non-wagering game. Features in different embodiments of FIGS. 1-6C may be suitably rearranged or combined to form additional embodiments of the invention.

The present embodiments are, therefore, to be considered in all respects as illustrative and not restrictive.

The invention claimed is:

1. A method for developing and deploying a game of chance, comprising the steps of:
    receiving, at a game registry of a computer-implemented game development platform, data representing a game of chance to be validated, the data including game math, game client, and game backend;
    compiling, at a compilation module of the computer-implemented game development platform, the data representing the game of chance so as to create a game of chance suitable for running on a gaming system with one or more game control modules regulated by one or more gaming regulatory agencies;
    validating, at a validation module of the computer-implemented game development platform, a compatibility of the compiled game of chance with the computer-implemented game development platform and the game math of the compiled game of chance to ensure that the game math is compliant with regulatory requirements; and
    publishing the validated game of chance on a game store of the computer-implemented game development platform such that the validated game of chance can be retrieved by the gaming system for operation.

2. The method of claim 1, further comprising the step of: developing, at a game development module of the computer-implemented game development platform, the data representing the game of chance to be validated.

3. The method of claim 2, wherein the game development module comprises one or more of: software development kit, simulator, and game development guide, for facilitating development of the data representing the game.

4. The method of claim 1, wherein the computer-implemented game development platform is arranged to host the validated game.

5. The method of claim 1, wherein the computer-implemented game development platform is distributed on a cloud computing arrangement.

6. The method of claim 1, wherein the gaming system is part of the computer-implemented game development platform.

7. The method of claim 1, wherein the game of chance is a wagering game.

8. The method of claim 7, wherein the game math comprises a pay table.

9. The method of claim 7, wherein the game math comprises RTP of the game.

10. The method of claim 7, wherein the one or more game control modules comprise one or more of game metering module and random result generator module.

11. A system comprising:
    a computer-implemented game development platform having:

a game registry arranged to receive data representing a game of chance to be validated, the data including game math, game client, and game backend;

a compilation module arranged to compile the data representing the game of chance so as to create a game of chance suitable for running on a gaming system with game control modules regulated by one or more gaming regulatory agencies;

a validation module arranged to validate a compatibility of the compiled game of chance with the computer-implemented game development platform and the game math of the compiled game of chance to ensure that the game math is compliant with regulatory requirements; and a game store for publishing the validated game of chance such that the validated game of chance can be retrieved by the gaming system for operation.

12. The system of claim 11, wherein the computer-implemented game development platform further comprises a game development module for developing the data representing the game of chance to be validated.

13. The system of claim 12, wherein the game development module comprises one or more of: software development kit, simulator, and game development guide, for facilitating development of the data representing the game.

14. The system of claim 11, wherein the computer-implemented game development platform is arranged to host the validated game.

15. The system of claim 11, wherein the computer-implemented game development platform is distributed on a cloud computing arrangement.

16. The system of claim 11, wherein the gaming system is part of the computer-implemented game development platform.

17. The system of claim 11, wherein the game of chance is a wagering game.

18. The system of claim 17, wherein the game math comprises a pay table.

19. The system of claim 17, wherein the game math comprises RTP of the game.

20. The system of claim 17, wherein the one or more game control modules comprise one or more of game metering module and random result generator module.

21. The system of claim 11, further comprising:
a computer-implemented gaming platform including the gaming system comprising:
a game storage arranged to store data representing the validated game of chance, the data including game math, game client, and game backend that have been compiled and certified prior to storage on the game storage;
a game engine operably connected with the game storage for operating the validated game of chance, the game engine providing an interface for
receiving game play instructions from a player for playing the validated game of chance,
processing the game play instructions to provide a game play result;
a random result generator, in connection with the game engine, for generating a random game result or a pseudorandom game result as a game play result, the random result generator being regulated by the one or more gaming regulatory agencies.

22. The system of claim 21, wherein the game storage is further arranged for storing game play result.

23. The system of claim 21, wherein the computer-implemented gaming platform is distributed on a cloud computing arrangement.

24. The system of claim 21, wherein the computer-implemented gaming platform further comprises a bonus or jackpot module operably connected with the game engine to provide a bonus game or jackpot prize.

25. The system of claim 21, wherein the game of chance is a wagering game.

26. The system of claim 25, wherein the computer-implemented gaming platform further comprises a credit handling module for handling wagering information associated with the game of chance.

27. The system of claim 25, wherein the computer-implemented gaming platform further comprises a game operation configuration module arranged to provide configuration information including regulatory information to the game engine for controlling operation of the game of chance.

* * * * *